TELEPHONE PROTECTIVE DEVICE

Filed Oct. 1, 1957

INVENTOR.
REGINALD McCLURE

BY Gustav Drews
his ATTORNEY

United States Patent Office 2,965,719
Patented Dec. 20, 1960

2,965,719

TELEPHONE PROTECTIVE DEVICE

Reginald McClure, Floral Park, N.Y. (226—16 114th St., Cambria Heights 11, St. Albans, N.Y.)

Filed Oct. 1, 1957, Ser. No. 687,447

5 Claims. (Cl. 179—27)

This invention relates to telephone protective devices and more particularly to devices to be attached to the telephone cords of cord switchboards.

In the use of cord switchboards of customers or lessees which are not equipped with toll diverting devices or mechanisms, operators have been harassed with the unauthorized dialing of toll calls, particularly long distance toll calls, without paying for the same. The problem arises when the extension lines are equipped with dials and the user dials his own call. The customer's switchboard operator completes her service when she plugs in the local telephone central and consequently is not informed whether the call is a local call or a toll call. If the call is being placed by a user, such as a caller or employee, whether intentional or not, who does not pay for the toll charge, the operator is of course confronted with the complaint by her employer for the placement of the toll call without collecting the charge for the same.

With systems characterized by cord switchboards equipped with toll diverting devices or mechanisms such as polarized relays, which systems are known by the employees of the telephone company as the 701 systems, the conventional customer dial system having polarized relays in the trunk system to recognize reversal of current from the central office long distance operator to the local extension to intercept long distance calls without knowledge of the customer's switchboard operator, then when the user picks up the receiver he would be connected through the user's switchboard with the ninth level trunk line. If he then dialed "0" for the local telephone exchange operator, or "211" for the long distance telephone exchange operator, the circuit would be diverted, that is, the polarity of the circuit would be reversed in the telephone central exchange and be blocked at or by the customer's switchboard enabling the operator at the customer's switchboard to be appraised of the attempt to dial a toll call. If the customer's cord switchboard was of the plain type constituting a part of a system known by the employees of the telephone company as the 550 system, the conventional plug board three wire tip ring and sleeve system, then when the user picks up the receiver on an extension line and dials "0" or "211" he would be connected with the desired toll telephone exchange operator who would then connect him with a toll or long distance number or station and the customer's switchboard operator would be entirely oblivious of the toll call and unless the user informed her of the toll call, she would be without means of obtaining a record of the user who placed the toll call.

With the aforesaid in mind the present invention aims to provide a device which may be connected intermediate the extension telephone unit and the common cord of the cord switchboard constituting a part of the plain or 550 system, by means of which device, should a user pick up a receiver of an extension line and dial "0" for the local operator, or "211" for the long distance exchange operator, the circuit in the line would be diverted, that is, the polarity reversed and the call blocked just as is the case with the 701 cord switchboards.

It is still another object of the present invention to provide a device of the character described which is light in weight, easy to manipulate so that the average unskilled mechanic can connect it in the cord between the jack in the switchboard of the extension telephone unit and the common or interconnecting cord of the customer's cord switchboard of the plain or 550 system, and which can be produced at a minimum of cost.

These and other features, capabilities, and advantages of the present invention will appear from the subjoined detailed description of one specific embodiment of the same illustrated in the accompanying drawings in which Fig. 1 is a diagrammatic view of a plain or 550 telephone system showing the extension receiver, plain cord switchboard, local central, long distance and local operator stations, and the wiring connecting the same to one another.

Figure 1:
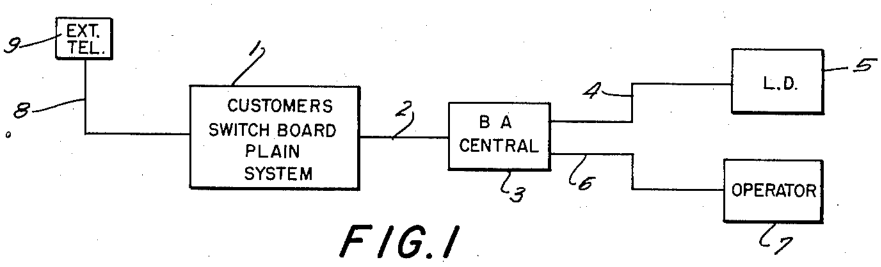

In the diagram shown in Fig. 1, there is shown diagrammatically a plain or 550 telephone system, the conventional plug board three wire tip ring and sleeve system, showing a customer's or user's cord switchboard 1 which is connected by the wiring 2 to the telephone company's local central station 3 such as the Barclay station in New York, the BA representing Barclay. From the station 3, the wiring 4 extends to the long distance station 5 and the wiring 6 extends to the operator's station 7. The "L.D." in the station 5 represents "long distance." The customer's switchboard 1 is connected by the wiring 8 to the extension telephone instrument 9.

Figure 2:
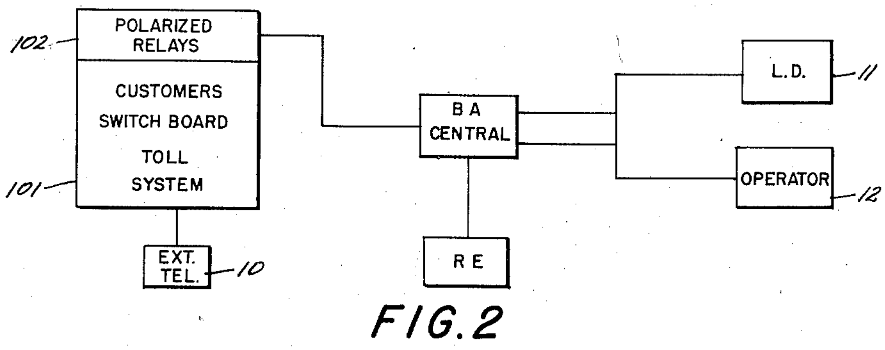
Fig. 2 is a diagrammatic view similar to Fig. 1 of a toll diverting or 701 telephone system.

The dial diverting or 701 system, the conventional customer dial system having polarized relays in the trunk system to enable the local operator to detect reversal of the current from the central office long distance operator to the local extension thereby to enable intercepting unauthorized long distance calls which might otherwise be overlooked by the customer's switchboard operator, illustrated in Fig. 2 differs from the plain or 550 system primarily in that the customer's switchboard 101 is equipped with a polarized relay 102 which is not the case with the customer's switchboard 1 shown in Fig. 1. With the 701 system illustrated in Fig. 2, when a user lifts a receiver at the extension 10 and dials "0" for the local telephone exchange operator or "211" for the long distance telephone exchange operator, then by means of a special service relay system at the long distance central station 11 or operator's central station 12, the polarity of the circuit would be diverted and then due to the polarized relay unit 102 at the customer's cord switchboard, the line would be blocked. However, with the plain or 550 system illustrated in Fig. 1, when the user at the extension 9 dials "0" or "211" he would be connected with the local central exchange operator at station 7 or the long distance central exchange operator at station 5 which operators in turn would carry out the instructions of the user for the call requested. At the same time, the operator of the customer's cord exchange switchboard 1 would be oblivious of the placement of the call and without information properly to charge the toll call whether local or long distance. Although the long distance telephone exchange 5 and operator exchange 7 in the plain or 550 system is equipped with the same special service relay system as used with the 701 system and reverses the polarity of the circuit, the plain or 550 system will permit the circuit to remain established and in turn permit a toll call to be completed through the customer's cord switchboard 1 and extension telephone 9. In other words, since the customer's cord switchboard 1 of the 550 system is not equipped with a toll diverting unit such as the polarized relay unit 102 illustrated diagrammatically in Fig. 2, the circuit will not be blocked at the customer's switchboard 1.

Due to the latter, customer's cord switchboards of the plain or 550 system have been helplessly harassed by so-called filching of toll calls by users such as employees, callers, and the like. With this problem in mind, the present invention has provided the toll diverting device or mechanism 13 illustrated in Fig. 3 which has a pin or plug 14 conforming to the conventional pin of the cord of a cord switchboard which pin or plug 14 is then plugged into the cord switchboard 1 with the unit 13 interposed between the jack in the switchboard 1 of the wiring 8 of the extension telephone 9 and the common cord of the cord switchboard 1, or interconnecting cord of the switchboard 1.

This unit 13 consists essentially of a casing 15 composed of plastic material and preferably constructed in two sections 16 and 17. In the section 16 the metal shell 18 of the pin is secured in the wall section 19 having the diminished contact neck or face 20 extending beyond the shell 18 and insulated from the same by an insulating layer 21 and a second contact face 22 insulated from the contact face 20 by the insulation 23. The conical contact end 22 is electrically connected to the plate 24 which is in turn connected by the conductor 25 to the prong 26 which is mounted in the insulated sleeve 27 secured to the metal sleeve 28 mounted in the wall 119. The diminished contact face 20 in turn is electrically connected to the plate 29 extending adjacent to the plate 24 but insulated from it as well as from the shell 18. This plate 29 is connected by the conductor 30 to the crystal selenium or half-wave rectifier 31 which consists of an insulated plug 32 in which there is disposed a plate 33 such as a polished metal disk connected to the conductor 30. The plate 33 in turn is engaged by the point contact 34 which is connected by the wire 35 to the prong 36 connected to the insulated sleeve 27. When the conventional pin 37 of the cord of a cord switchboard 1 is inserted into the sleeve 28 constituting a secondary switchboard jack, its metal shell 38 will engage the metal shell 28 which is in electrical communication with the shell 18 of the pin 14 by the conductor 39. The pin 37 of the common switchboard cord also has a diminished neck 40 insulated from the shell 38 which is in contact with the projection 41 in the prong 36. The contact face 42 of the pin 37 insulated from the diminished contact plate 40 in turn is in engagement with the projection 43 of the prong 26.

When the unit 13 aforesaid is interposed between the pin 37 of the wiring 8 of the extension telephone unit 9 and the customer's cord switchboard 1, it will serve the same function as is now so served by the polarized relay unit 102 illustrated in Fig. 2 so that when "0" or "211" is dialed, upon the reversion of the polarity of the circuit by the special service relay unit at long distance central station 5 or at the operators' central station 7, the circuit when returning to the unit 13 will be blocked and the operator at the customer's cord switchboard 1 will be informed of the attempt by a user of the extension telephone unit 9 to place a toll call.

Figure 3:
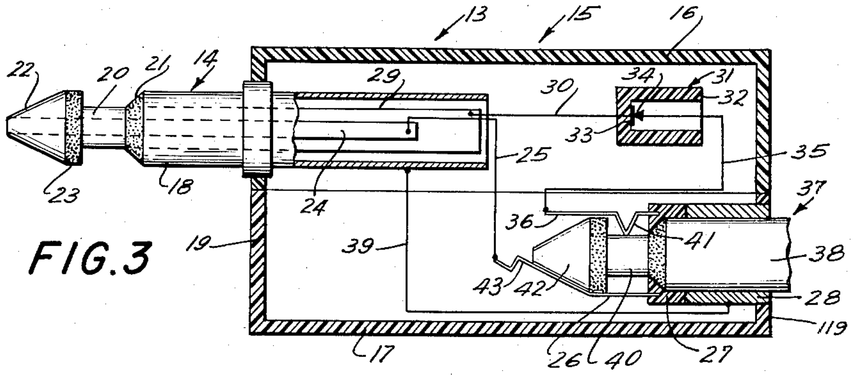
Fig. 3 is a side elevation partly in section of the device constituting the present invention.
Figure 4:
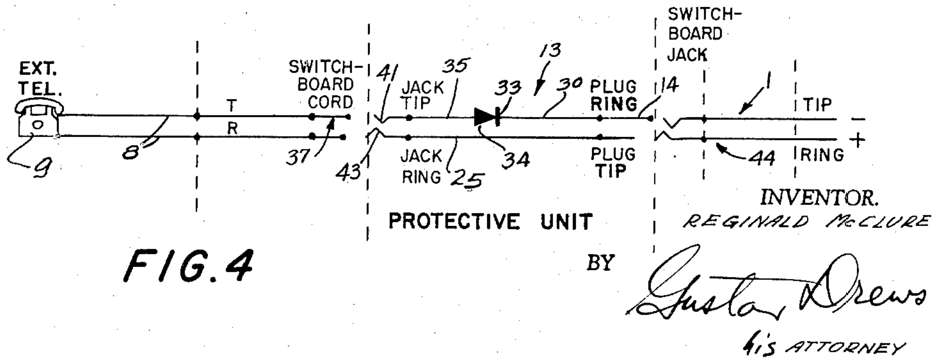
Fig. 4 is another diagram showing the wiring from the telephone extension to the switchboard cord to the toll diverting device, to the cord switchboard of a plain or 550 telephone system.

The toll diverting device or mechanism 13 is extremely light in weight and can be made at a weight of less than 2 ounces, nearer 1½ ounces, it being of course understood that the illustration in Fig. 3 is considerably enlarged, the unit in actual practice ordinarily not exceeding 3 inches in length and 1¼ inches in width and ⅝ inch in thickness, with the pin 14 in diameter of course conforming to the diameter of the conventional pins today provided on the conventional cord switchboards of the plain or 550 system. Furthermore, since the operator is merely required to secure the unit 13 to the pin 37 of the conventional common switchboard cord and then insert the pin 14 into the switchboard, it is of course obvious that the most unskilled operator could manipulate this device without difficulty.

The sections 16 and 17 of the casing 13 may be secured to one another by any suitable means such as adhesive if composed of plastic material or any other suitable means without departing from the general spirit of the invention.

The circuit through the two wires 25 and 35 from the tip 22 and ring 20 respectively will of course be sufficient to transmit a message by a party dialing either at the extension telephone 9 or at the customer's cord switchboard 1. The circuit through the wire 39 from the shell 14 to the shell 28 is primarily for use by the telephone company to transmit signals supplementing the transmission of a message in accordance with convention.

It is obvious that any suitable diode such as a copper oxide diode instead of the crystal selenum rectifier could be used without departing from the general spirit of the invention.

It is obvious that various changes and modifications may be made to the details of construction without departing from the general spirit of the invention as set forth in the appended claims.

It is of course obvious that since the jack 44 for the exchange central is the one which receives the end of the common cord provided with the attachment 13 and the jack in the switchboard connected to the telephone central exchange is connected to the end of the common cord which is merely provided with a pin or plug such as the pin 14, in order to interrupt the current when it is reversed, then should the current be reversed, that is, the polarity of the current be reversed inadvertently, it would only be necessary to connect the end of the cord merely provided with the pin 14 to the jack 44 in the switchboard connected to the extension telephone and to connect the end of the common cord provided with the attachment 13 to the jack in the switchboard connected to the central exchange to permit a local call to be dialed when the circuit or polarity of the circuit has been so inadvertently reversed.

It is of course also obvious that the other end of the interconnecting or common switchboard cord to which the pin 37 is connected is also provided with a pin which is required to be inserted into the jack of the switchboard 1 which is connected to the wiring 2 of the telephone exchanges.

I claim:

1. The combination of a conventional telephone cord switchboard having a plurality of conventional jacks, a telephone extension unit, an interconnecting or common switchboard cord having a first pin at one of its ends, a protective unit having two wires, a second switchboard pin at one of the ends of said latter two wires, a jack at the other of the ends of said two wires receiving said first pin, and a rectifier in series with the wires of said protective unit, and said second pin connected to the jack of said switchboard whereupon when a circuit through said protective unit is reversed the current will be interrupted.

2. The combination as set forth in claim 3 in which said rectifier is a point contact crystal selenium unit having a polished disk and a point contact with said disk.

3. The combination of a conventional telephone cord switchboard having a plurality of conventional jacks, a telephone extension unit, an interconnecting or common switchboard cord having a first pin at one of its ends, a protective unit having two wires, a second switchboard pin at one of the ends of said latter two wires, a jack at the other of the ends of said two wires receiving said first pin, and a diode in series with the wires of said protective unit, and said second pin connected to the jack of said switchboard whereupon when a circuit through said protective unit is reversed the current will be interrupted.

4. The combination of a conventional telephone cord switchboard having a plurality of conventional jacks, and a common or interconnecting cord with a pin at the free end of said cord and a protective unit having a rectifier interposed between said pin and one of said jacks obstructing the passage of currents through reversed circuits.

5. The combination of a telephone cord switchboard having a plurality of conventional jacks, and a common or interconnecting switchboard cord having a pin at the free end of said cord, a telephone extension unit, and a protective unit having a rectifier interposed between said pin and the jack of said switchboard to obstruct the passage of reversed currents.

References Cited in the file of this patent

UNITED STATES PATENTS

| | | |
|---|---|---|
| 1,951,149 | Hotay | Mar. 13, 1934 |
| 1,979,317 | Curtis | Nov. 6, 1934 |
| 2,041,933 | Inglis | May 26, 1936 |
| 2,593,419 | Den Hertog | Apr. 22, 1952 |
| 2,729,703 | Faulkner et al. | Jan. 3, 1956 |
| 2,806,084 | Gallagher | Sept. 10, 1957 |

FOREIGN PATENTS

| | | |
|---|---|---|
| 284,756 | Great Britain | Feb. 1, 1928 |